3,316,112
STABILIZED PROTEINACEOUS ADHESIVES
Ralph R. Langner, Lake Jackson, Tex., assignor to The Dow Chemical Company, Midland, Mich., a corporation of Delaware
No Drawing. Filed Dec. 19, 1963, Ser. No. 331,954
7 Claims. (Cl. 106—124)

This invention relates to new protein-based adhesive compositions which are resistant both to microbial attack and to loss of adhesive strength on storage. It also relates to a new stabilized preservative for use with proteinaceous compositions.

Protein-based adhesives containing casein, blood proteins, soybean proteins, and the like are widely used as joint and texturing cements, wood glues, and paper glues. These compositions are well known to be subject when stored in the dry state to attack by microorganisms such as fungi and putrefactive bacteria. The adhesive bonds made with such compositions are also subject to attack. Therefore, in order to provide such adhesive compositions with a practical shelf life and also to provide adhesive bonds made from these compositions with resistance to microbial attack, it is necessary to incorporate them in a suitable preservative.

Preservatives which depend upon the slow release of formaldehyde for their effect cannot be used in proteinaceous adhesives because the liberated formaldehyde reacts with the protein, even in the dry state, causing insolubilization of the protein and consequent loss of adhesive quality. The reacted formaldehyde is also no longer available as a preservative.

There is a class of compounds which release formaldehyde but which have antimicrobial properties in addition to those dependent upon the free formaldehyde. These compounds are the quaternary ammonium salts of hexamethylenetetramine with reactive organic halides such as benzyl chloride, propargyl bromide, 2-iodoacetamide, 2-(chloromethyl)thiophene, 1,3-dichloropropene, and the like. These salts are water-soluble and are effective antimicrobials over a wide range of pH. Their use in protein-containing adhesives, however, has been prevented in the past by the lack of means to block the undesirable effect of formaldehyde.

It has been found that a proteinaceous adhesive compostion is effectively protected against microbial attack by the incorporation therein of a small quantity of a hexamethylenetetramine-organic halide quaternary salt and the valuable properties of the adhesive are retained when there is also included in the dry composition about 0.1% to about 15% of its weight of urea. Preferably, about 0.5–5% of urea is employed. The optimum amount of urea depends upon the quantity of quaternary preservative present and the length of storage life required.

Apparently, the urea reacts preferentially with formaldehyde as it is liberated from the quaternary salt, thereby blocking its destructive attack upon the protein component. The reaction product of formaldehyde and urea has some adhesive properties of its own and this may explain why the adhesive properties of the composition are diluted less than they might be expected to be by the quaternary salt and urea additives.

Although the stabilizing effects of the quaternary salt and urea are particularly beneficial in prolonging the shelf life of the dry adhesive composition, the two additives also exert their preservative and stabilizing effects after the dry composition has been mixed with water and applied as an adhesive. The adhesive bond, therefore, is also resistant to microbial attack and retains its strength since the urea continues to block the attack of liberated formaldehyde on the proteinaceous base.

The quaternary salts used in this invention are easily prepared as shown in various papers on the subject by contacting an organic compound having a reactive halogen substituent with hexamethylenetetramine in a solvent such as chloroform, carbon tetrachloride, or ethanol at moderate temperatures, whereupon the quaternary salt separates as a crystalline solid. The salt thereby obtained is ordinarily the adduct of one molecule of hexamethylenetetramine with one molecule of halide, even though the halide molecule in some cases contains more than one halogen atom. These salts are very effective antimicrobial agents and only small quantities need be used to obtain their preservative effect. In an adhesive composition as described herein, a proportion of about 0.001% to about 1% of one or more of these salts based on the weight of the whole composition on a dry basis is ordinarily used and usually about 0.005–0.5% is satisfactory. There should be present about 2–100 parts by weight of urea per part of quaternary salt in the composition. The stabilized preservative combination for use with proteinaceous compositions, therefore, in effect is a mixture of about 2–100 parts by weight of urea and one part of a hexamethylenetetramine-organic halide quaternary salt. Such a stabilized preservative is useful generally to protect protein-containing compositions where liberated formaldehyde would have an adverse effect because of its reaction with the protein.

The following examples illustrate the effect of formaldehyde on a proteinaceous adhesive and the use of the new stabilized preservative combination to protect such a composition.

*Example 1*

Samples of a powdered casein-based adhesive composition designed for use as a joint and texturing cement on gypsum wall board was compounded with 0.5% by weight of hexamethylenetetramine and with 0.01% of paraformaldehyde respectively. To samples of each of these compositions there were added 1% of urea. Samples of all these compositions, with and without additives, were then stored dry for one or more weeks at room temperature. At the end of the storage period, sufficient water was mixed with a sample to make a paste of suitable consistency and this paste was used to stick toweling to the surface of gypsum wallboard. After the paste had dried, the toweling was cut with a razor blade into strips one inch wide and the covered wallboard was maintained at 70° F. and 50% relative humidity for 48 hours. The strength of adhesion of the toweling to the wallboard surface was then determined according to test method ASTM D-903-49. The results are listed in Table 1 below as average pounds of peel or stripping length for the one inch wide toweling strips.

TABLE 1

| Weeks of Dry Storage | Average Pounds of Peel Strength | | | | |
|---|---|---|---|---|---|
|  | Control (No additive) | 0.5% HA [1] | 0.5% HA, 1% Urea | 0.01% PF [2] | 0.01% PF, 1% Urea |
| 1 | 0.62 | 0.63 | 0.63 | 0.50 | 0.57 |
| 3 | 0.87 | 0.44 | 0.52 | 0.30 | 0.47 |
| 7 | 0.63 | 0.25 | 0.47 | 0.45 | 0.62 |

[1] Hexamethylenetetramine.
[2] Paraformaldehyde.

Hexamethylenetetramine and paraformaldehyde are not suitable preservatives for proteinaceous adhesives, but both release formaldehyde under the storage conditions used. They were employed here to illustrate the gradual loss of adhesive power by a protein-based composition caused by formaldehyde and the blocking or limiting of that loss by urea.

Example 2

Stabilized adhesive compositions were prepared by adding 0.1% by weight of the quaternary salt formed by the reaction of one mole each of hexamethylenetetramine with 1,3-dichloropropene to samples of the dry casein-based adhesive used in Example 1. Various amounts of urea were incorporated into some of these compositions. The adhesive strength of these compositions was measured as described above after various periods of storage and the results were compared with those obtained with a control which contained no additive. These results are listed in average pounds of peel strength for one inch strips as in Table 1.

TABLE 2

| Weeks of Storage | Average Pounds of Peel Strength | | | | | |
|---|---|---|---|---|---|---|
| | No Urea No Preservative | No Urea | 0.5 Wt. percent Urea | 1.0% Urea | 2.0% Urea | 10% Urea |
| 1 | 0.62 | 0.75 | 0.75 | 1.12 | 0.75 | 0.75 |
| 3 | 0.87 | 0.44 | 0.87 | 1.12 | 1.12 | |
| 7 | 0.63 | 0.40 | 0.44 | 0.52 | 0.63 | 0.67 |
| 12 | 0.63 | | 0.47 | 0.62 | 0.67 | |

Example 3

Two samples of the powdered casein-based adhesive used in Examples 1 and 2 were combined respectively with 0.1% by weight of the quaternary salt of hexamethylenetetramine and benzyl chloride and with 0.1% of that salt together with 1% of urea. These formulations were tested for retention of adhesive power as described in Example 1.

TABLE 3

| Additive | Weeks of Storage | Average Pounds of Peel Strength |
|---|---|---|
| 0.1% HA, Benzyl chloride salt | 1 | 0.75 |
| | 6 | 0.52 |
| 0.1% HA, Benzyl chloride salt plus 1% urea | 1 | 0.63 |
| | 6 | 0.62 |

Examples 4–5

Additional samples of the same casein-based adhesive mixed with hexamethylenetetramine salts with and without added urea stabilizer and tested for retention of adhesive power as described in Example 1. The results obtained are listed below.

TABLE 4

| Additive | Days of Storage | Average Pounds of Peel Strength |
|---|---|---|
| 0.1% HA-3-iodo-2-propyn-1-ol salt | 80 | 0.63 |
| Same plus 1% urea | 80 | 0.87 |
| 0.2% HA-1-bromo-3-chloro-2-methylpropane salt | 80 | 0.3 |
| Same plus 1% urea | 80 | 1.12 |

All samples showed substantially the same peel strength at the start of the storage period.

I claim:

1. A proteinaceous adhesive composition consisting essentially of a protein of the group consisting of casein, blood proteins, and soybean proteins and as stabilizing additives therefor about 0.001% to about 1% by weight on a dry basis of a quaternary ammonium salt of hexamethylenetetramine with an organic halide and about 0.1% to about 15% by weight of urea.

2. The composition of claim 1 wherein the organic halide is 1,3-dichloropropene.

3. The composition of claim 1 wherein the organic halide is benzyl chloride.

4. The composition of claim 1 wherein the organic halide is 3-iodo-2-propyn-1-ol.

5. The composition of claim 1 wherein the organic halide is 1-bromo-3-chloro-2-methylpropane.

6. The composition of claim 1 wherein the proteinaceous adhesive is a casein adhesive.

7. The composition of claim 1 wherein the adhesive is based on a protein selected from the group consisting of casein, blood proteins, and soybean proteins and wherein the organic halide is selected from the group consisting of benzyl chloride, propargyl bromide, 2-iodo-acetamide, 1,3-dichloropropene, 2-(chloromethyl)thiophene, 3-iodo-2-propyn-1-ol, and 1-bromo-3-chloro-2-methylpropane.

References Cited by the Examiner
UNITED STATES PATENTS

| | | | |
|---|---|---|---|
| 1,852,706 | 4/1932 | Eisenstein | 106—138 |
| 2,398,317 | 4/1946 | MacKenzie et al. | 106—124 |
| 2,613,155 | 10/1952 | White | 106—138 |

MORRIS LIEBMAN, *Primary Examiner.*

D. J. ARNOLD, *Assistant Examiner.*